US008321546B2

(12) United States Patent
Regnier et al.

(10) Patent No.: US 8,321,546 B2
(45) Date of Patent: *Nov. 27, 2012

(54) INTEGRATING DISCOVERY FUNCTIONALITY WITHIN A DEVICE AND FACILITY MANAGER

(75) Inventors: Alain Regnier, Sunnyvale, CA (US); Lifen Tian, Sunnyvale, CA (US); Yaotian Wang, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 622 days.

This patent is subject to a terminal disclaimer.

(21) Appl. No.: 11/652,179

(22) Filed: Jan. 10, 2007

(65) Prior Publication Data

US 2008/0168440 A1 Jul. 10, 2008

(51) Int. Cl.
*G06F 15/173* (2006.01)

(52) U.S. Cl. ........ 709/223; 709/203; 709/220; 709/227; 719/318; 719/319; 719/328; 719/330

(58) Field of Classification Search .................. 709/203, 709/220, 223, 206, 224, 227; 719/318, 319, 719/328, 330

See application file for complete search history.

(56) References Cited

U.S. PATENT DOCUMENTS

| | | | |
|---|---|---|---|
| 5,452,452 | A | 9/1995 | Gaetner et al. |
| 5,867,735 | A | 2/1999 | Zuravleff et al. |
| 6,405,310 | B1 | 6/2002 | Simpson |
| 6,421,354 | B1 | 7/2002 | Godlewski |
| 6,449,657 | B2 | 9/2002 | Stanbach et al. |
| 6,483,805 | B1 | 11/2002 | Davies et al. |
| 6,502,128 | B1 * | 12/2002 | Kumpf .......................... 709/221 |
| 6,571,277 | B1 | 5/2003 | Daniels-Barnes et al. |

(Continued)

FOREIGN PATENT DOCUMENTS

EP 1 809 004 A2 7/2007

(Continued)

OTHER PUBLICATIONS

Service-Oriented Device Communications USing the Devices Profile for Web Services, Francois Jammes, Antoine Mensch and Harm Smit, Copyright 2005 and Year of Publication: 2005 ISBN:1-59593-268-2.*

(Continued)

*Primary Examiner* — Kamal Divecha
(74) *Attorney, Agent, or Firm* — Hickman Palermo Truong Becker Bingham Wong LLP

(57) ABSTRACT

Techniques are provided for implementing the WS-DeviceProfile standard as a multi-threaded process ("DFM") executing on a multi-function peripheral ("MFP"). The DFM takes care of the discovery of devices and services on a network. The DFM also acts as a facility manager. The DFM implements various web services in a single component that applications can re-use. The DFM insulates these applications from some of the more complex details of the web services that the DFM implements. The MFP may comprise several different applications that each use web services provided by the DFM. The threads of the DFM can handle separate tasks concurrently. For example, one thread, of the multi-threaded DFM, may perform one or more functions specified by the WS-DeviceProfile protocol, while another thread may perform one or more functions specified by a WS-Discovery protocol.

18 Claims, 10 Drawing Sheets

U.S. PATENT DOCUMENTS

| | | | |
|---|---|---|---|
| 6,631,407 B1 * | 10/2003 | Mukaiyama et al. | 709/223 |
| 6,633,874 B1 | 10/2003 | Nusbickel | |
| 6,718,378 B1 * | 4/2004 | Machida | 709/223 |
| 6,734,985 B1 | 5/2004 | Ochiai | |
| 6,842,898 B1 * | 1/2005 | Carlson et al. | 718/100 |
| 6,873,427 B1 * | 3/2005 | Matsuda et al. | 358/1.15 |
| 7,058,734 B2 * | 6/2006 | Chen et al. | 710/18 |
| 7,065,556 B1 * | 6/2006 | Hickey et al. | 709/217 |
| 7,072,987 B2 * | 7/2006 | Jurisch et al. | 709/249 |
| 7,127,700 B2 | 10/2006 | Large | |
| 7,191,446 B2 | 3/2007 | Kosanovic | |
| 7,373,422 B1 | 5/2008 | Paul et al. | |
| 7,415,562 B2 * | 8/2008 | Chen et al. | 710/300 |
| 7,430,670 B1 * | 9/2008 | Horning et al. | 713/190 |
| 7,433,873 B2 | 10/2008 | Kang | |
| 7,467,384 B2 | 12/2008 | Brubacher et al. | |
| 7,567,360 B2 * | 7/2009 | Takahashi et al. | 358/1.15 |
| 7,633,644 B2 | 12/2009 | Lum et al. | |
| 7,765,248 B2 | 7/2010 | Kanasaki | |
| 7,856,638 B2 | 12/2010 | Kaneda | |
| 7,895,361 B2 * | 2/2011 | Nishio | 709/246 |
| 8,112,766 B2 * | 2/2012 | Regnier et al. | 719/320 |
| 2002/0129110 A1 * | 9/2002 | Liu et al. | 709/206 |
| 2002/0156872 A1 | 10/2002 | Brown | |
| 2003/0110242 A1 | 6/2003 | Brown et al. | |
| 2003/0182347 A1 * | 9/2003 | Dehlinger | 709/1 |
| 2003/0187995 A1 | 10/2003 | Fok et al. | |
| 2003/0193685 A1 * | 10/2003 | Kageyama | 358/1.14 |
| 2003/0225894 A1 | 12/2003 | Ito | |
| 2004/0055002 A1 | 3/2004 | Das | |
| 2004/0111506 A1 | 6/2004 | Kundu et al. | |
| 2004/0111709 A1 | 6/2004 | Furst et al. | |
| 2004/0121789 A1 | 6/2004 | Lindsey | |
| 2004/0128558 A1 | 7/2004 | Barrett | |
| 2004/0143651 A1 * | 7/2004 | Allen et al. | 709/221 |
| 2004/0143671 A1 | 7/2004 | Idnani | |
| 2004/0226029 A1 | 11/2004 | Gelme | |
| 2004/0236829 A1 | 11/2004 | Xu et al. | |
| 2004/0249911 A1 | 12/2004 | Alkhatib et al. | |
| 2004/0267876 A1 | 12/2004 | Kakivaya et al. | |
| 2005/0021728 A1 * | 1/2005 | Sugimoto | 709/223 |
| 2005/0038708 A1 | 2/2005 | Wu | |
| 2005/0060431 A1 | 3/2005 | Lewontin | |
| 2005/0063003 A1 | 3/2005 | Mishima et al. | |
| 2005/0071507 A1 | 3/2005 | Ferlitsch | |
| 2005/0086330 A1 | 4/2005 | Perham et al. | |
| 2005/0138065 A1 | 6/2005 | Ciriza | |
| 2005/0144218 A1 | 6/2005 | Heintz | |
| 2005/0182843 A1 | 8/2005 | Reistad et al. | |
| 2005/0246428 A1 | 11/2005 | Araumi | |
| 2006/0031395 A1 * | 2/2006 | Kumagawa et al. | 709/217 |
| 2006/0077454 A1 | 4/2006 | Lum et al. | |
| 2006/0095541 A1 | 5/2006 | Sojian et al. | |
| 2006/0112012 A1 * | 5/2006 | Osborne | 705/43 |
| 2006/0117084 A1 * | 6/2006 | Morozumi et al. | 709/203 |
| 2006/0158676 A1 * | 7/2006 | Hamada | 358/1.14 |
| 2006/0174026 A1 | 8/2006 | Robinson et al. | |
| 2006/0190580 A1 | 8/2006 | Shu et al. | |
| 2006/0256392 A1 | 11/2006 | Van Hoof et al. | |
| 2007/0073865 A1 | 3/2007 | Motoyama et al. | |
| 2007/0083618 A1 | 4/2007 | Kim | |
| 2007/0083679 A1 | 4/2007 | Kikuchi | |
| 2007/0086430 A1 * | 4/2007 | Kemp | 370/352 |
| 2007/0097969 A1 | 5/2007 | Regnier | |
| 2007/0118642 A1 | 5/2007 | Kumbalimutt | |
| 2007/0220142 A1 | 9/2007 | Moorer et al. | |
| 2008/0027988 A1 | 1/2008 | Regnier | |
| 2008/0147886 A1 * | 6/2008 | Ferlitsch | 710/1 |
| 2009/0271501 A1 | 10/2009 | Shenfield et al. | |

FOREIGN PATENT DOCUMENTS

| | | |
|---|---|---|
| JP | 2000-215099 | 8/2000 |
| JP | 2004-507818 | 3/2004 |
| JP | 2004-114674 | 4/2004 |
| JP | 2005339520 A | 12/2005 |
| JP | 2006295883 | 10/2006 |
| KR | 2004000697 A | 1/2004 |

OTHER PUBLICATIONS

European Patent Office, "Extended European Search Report," App. No. 06255625.3, dated Feb. 27, 2007, 7 pages.

Haring, Dr. Günther, "Systemarchitektur und Diensts für Allgegenwärtige, Kontext-Sensitive Informationsysteme," Endbericht zum Forschungsauftrag des Bundesministeriums fur Verkehr, Innovation und Technologie, Jan. 1, 2003, pp. 1-135, XP 002420364.

Jammes, Francois et al., "Service oriented device communications using the devices profile for Web services", ACM 2005, 8 pages.

Stal, Michael, "Web Services: beyond component-based computing", ACM Oct. 2002, vol. 45, No. 10, pp. 71-76.

Vedamuthu, Asir s. et al., Web Services Policy 1.5-Primer W3C Working Draft Dec. 21, 2006; http://w3.org/TR/ws-policy-primer/ 30 pgs., print date Mar. 6, 2007.

Wright, Don, "The Ubiquity of Print Enabling Printing within the Ubiquitous Web," http://www.w3.org/2006/02/lexmark-paper.pdf, 8 pgs., print date Mar. 6, 2007.

The Patent Office of the People's Republic of China, "The First Office Action", application No. 200610137667.1, dated Feb. 6, 2009, 7 pages. (Un-translated OA provided as well, 6 pages.).

European Patent Office, "European Search Report", application No. EP 08165235, dated Mar. 25, 2009, 8 pages.

Quiroz, Andres, et al., "Design and Implementation of a Distributed Content-based Notification Broker for WS-Notification", XP-002519356, IEEE, 2006, 8 pages.

Vinoski, Steve, "Web Services Notifications", Toward Integration, XP-002519355, IEEE Computer Society, 2004, 6 pages.

Box, Don, et al., "Web Services Eventing (WS-Eventing)", XP-002519357, Aug. 2004, 38 pages.

Communication received from Application No. 07122381.2-2413 / 1959638 dated Jul. 30, 2008 (7 pages).

"Devices Profile for Web Services" XP-002485806 dated Feb. 2006 (40 pages).

"Management of Hardware Resources in the Datacenter Using Embedded Web Services" XP-002485809 dated May 17, 2006 (8 pages).

U.S. Appl. No. 11/641,366, filed Dec. 18, 2006, Office Action, Jun. 30, 2010.

U.S. Appl. No. 11/641,454, filed Dec. 18, 2006, Final Office Action, Aug. 3, 2010.

Herriot et al., "Internet Printing Protocol (IPP): Event Notifications and Subscriptions", Mar. 2005, Xerox Corp., Request for Comments: 3995, pp. 1-95.

European Communication received in Application No. 07252034.9 dated Nov. 5, 2010 (11 pages).

Ekanayake, J. et al., "Common Architecture for Functional Extensions on Top of Apache Axis 2" XP002455230, Apr. 24, 2006 (6 pages).

Anonymous, "Axis2 Architecture guide" Internet Article, XP002455231, Apr. 7, 2006 (12 pages).

Buschmann, F. et al., "Pattern-Oriented Software Architecture," XP002455240, 1996 (10 pages).

Ivens, K. et al., "Windows 2000: The Complete Reference" 2000, 15 pages.

Hansen, Jennie, Distributed Largest-First Algorithm for Graph Coloring, Springer-Verlag, Berlin Heidelberg, 2004.

Seely Scott, "Understanding WS-Security" Web Services Specifications, Microsoft Corporation, Dated Oct. 2002, 12 pages.

Alexander et al., "Web Services Transfer (WS-Transfer)", W3C Member Submission, Dated Sep. 27, 2006, 24 pages.

Web Services Security, "SOAP Message Security 1.1 (WS-Security 2004)", OASIS Standard Specification, Dated Feb. 1, 2006, 76 pages.

U.S. Appl. No. 11/818,013, filed Jun. 12, 2007, Notice of Allowance, Apr. 17, 2012.

* cited by examiner

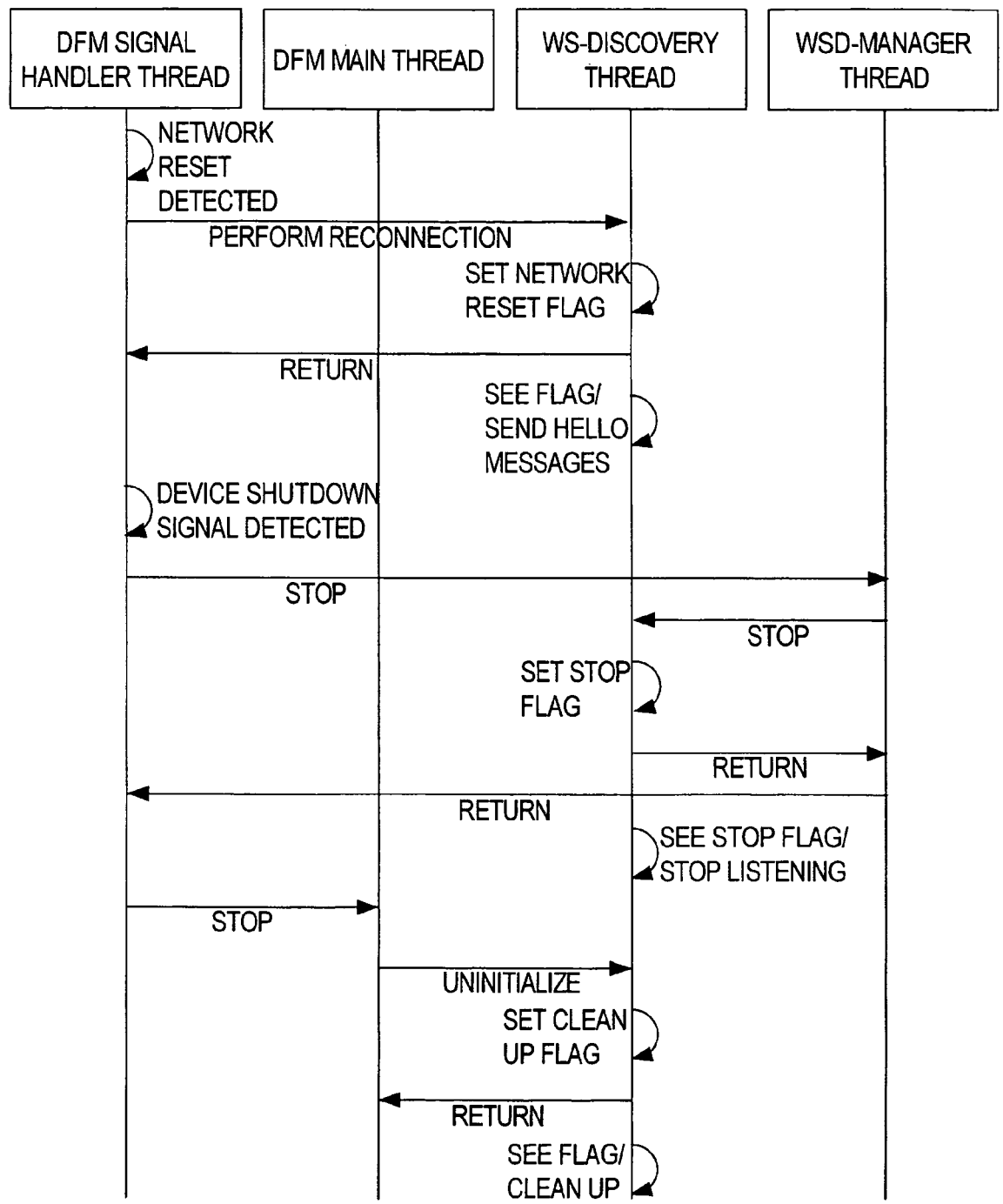

INTEGRATING DISCOVERY FUNCTIONALITY WITHIN A DEVICE AND FACILITY MANAGER

CROSS-REFERENCE TO RELATED APPLICATIONS

This application is related to the following U.S. Patent Applications, the contents of each of which are incorporated by reference for all purposes as though fully disclosed herein: U.S. patent application Ser. No. 11/265,835, titled "APPROACH FOR DISCOVERING NETWORK RESOURCES;" filed on Nov. 2, 2005; U.S. patent application Ser. No. 11/497,000, titled "ADVANCED WEB SERVICES ON A LEGACY PLATFORM," filed on Jul. 31, 2006; and U.S. patent application Ser. No. 11/644,181, titled "MULTI-THREADED DEVICE AND FACILITY MANAGER," filed on Dec. 21, 2006.

FIELD OF THE INVENTION

The present invention relates to providing web services, and more particularly to implementing the WS-DeviceProfile standard as a multi-threaded process executing on a multi-function peripheral ("MFP").

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The World Wide Web ("WWW") is a global, read-write information space. Text documents, images, multimedia and many other items of information, referred to as resources, are identified by short, unique, global identifiers called Uniform Resource Identifiers ("URIs") so that each can be found, accessed and cross-referenced in the simplest possible way. The World Wide Web Consortium ("W3C") is an international consortium where member organization, a full-time staff, and the public work together to develop standards for the World Wide Web. The W3C defines a "web service" as a software system that is designed to support interoperable machine-to-machine interaction over a network. This definition encompasses many different systems, but in common usage, the term refers to those services that use SOAP-formatted Extensible Markup Language ("XML") envelopes and that have their interfaces described by Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks.

The specifications that define web services are intentionally modular, and, as a result, there is no one document that defines all web services. Instead, there are a few core specifications that are supplemented by other specifications as the circumstances and choice of technology dictate. The most common core specifications are SOAP, WSDL, WS-Security, and WS-ReliableExchange. Different specifications address different tasks and functions.

SOAP is an XML-based, extensible message envelope format, with bindings to underlying protocols (e.g., HTTP and Simple Mail Transfer Protocol ("SMTP")). Using XML, SOAP defines how messages should be formatted, so that those messages are formatted in such a way that the recipients of those messages (devices and applications) can understand those messages. SOAP can be used to perform remote procedure calls, for example.

WSDL is an XML format that allows web service interfaces to be described along with the details of those interfaces' bindings to specific protocols. WSDL is typically used to generate server and client code, and for configuration. WS-Security defines how to use XML encryption and XML signature in SOAP to secure message exchanges. WS-ReliableExchange is a protocol for reliable messaging between two web services.

SUMMARY

Embodiments of the invention involve a specific implementation of the WS-DeviceProfile specification. Embodiments of the invention include a device and facility manager ("DFM") that is not expressly specified in the WS-DeviceProfile specification. The DFM uses various web services (e.g., those specified by WS-Addressing, WS-Discovery, WS-Security, etc.) and describes how to use those web services to perform various tasks. The DFM performs discovery of devices and services on a network. The DFM also acts as a facility manager. The DFM implements various web services in a single component that applications can use and re-use. The DFM insulates these applications from details of the web services that the DFM implements.

In one embodiment of the invention, the DFM is implemented within a device, which may include, but is not limited to, a multi-function peripheral ("MFP"). For example, the MFP may comprise several different applications, each of which has a different function (e.g., printing, scanning, faxing, etc.). Each of these applications may use the web services provided by the DFM. Additional applications that are later dynamically added to the MFP also may use the web services provided by the DFM. Because the most commonly used web services (such as WS-Discovery) are provided by the DFM, these web services do not need to be implemented separately by each application.

In one embodiment of the invention, the DFM is implemented as multiple threads of execution. The multi-threaded nature of the DFM increases efficiency. When the DFM comprises multiple threads, separate threads can handle separate tasks concurrently. For example, one thread executing on the device may perform a first set of one or more functions specified by the WS-DeviceProfile protocol, e.g., the thread may perform tasks related to the management of web services protocols provided by the device. Another thread executing on the device may perform a second set of one or more functions specified by a WS-Discovery protocol, e.g., the thread may communicate with other devices to inform those devices that the device is available and what are the capabilities of the device.

Embodiments of the invention may increase the efficiency of the DFM using other approaches. For example, threads of the DFM may communicate with each other by setting and reading flags, thereby minimizing the time in which one thread is waiting upon another. Also, portions of the DFM may be implemented using a static class, thereby avoiding the complexities of managing pointers to instantiated objects.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9 is a second sequence diagram illustrating communication between multiple threads of a DFM according to an embodiment of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
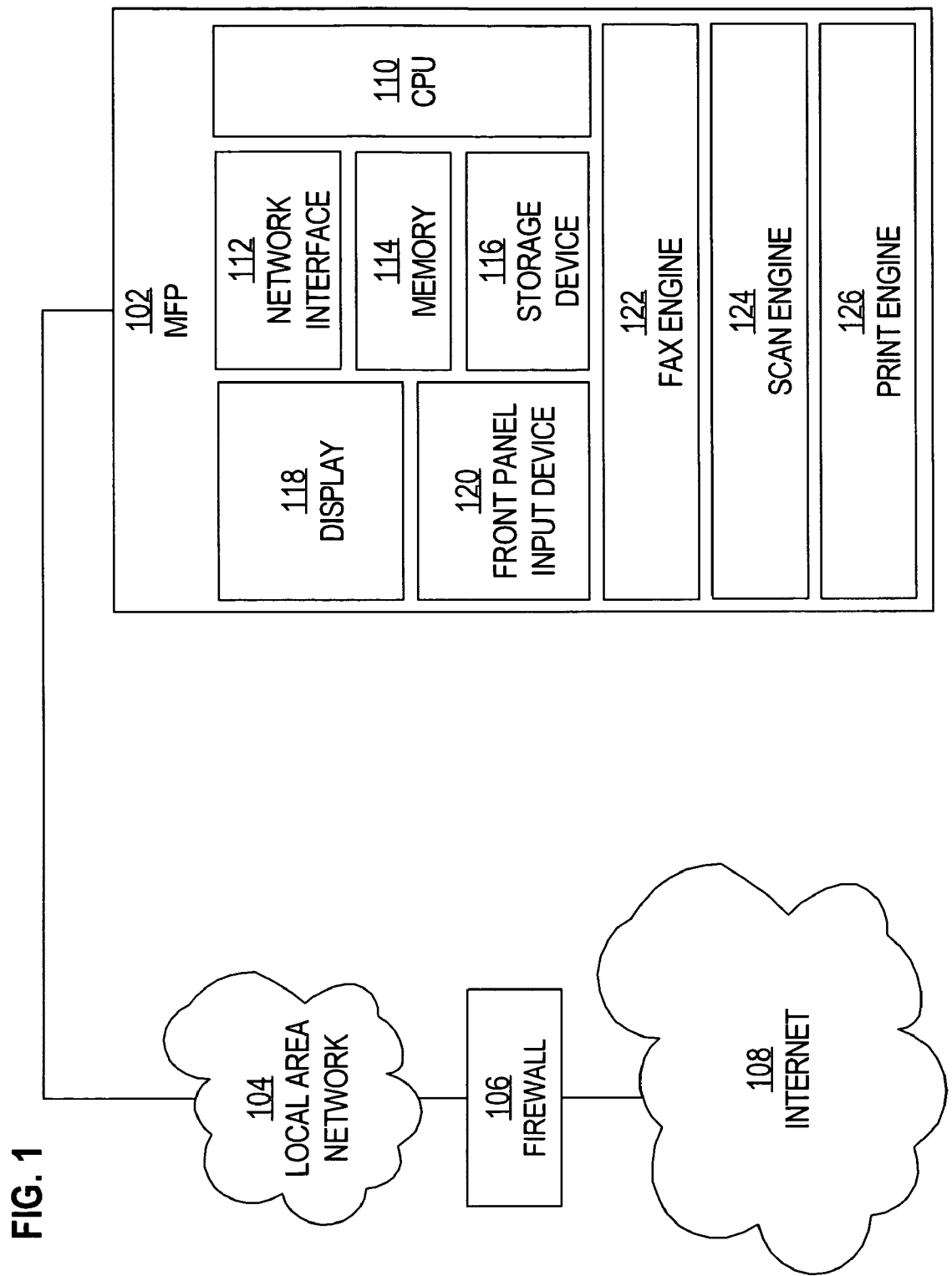
FIG. 1 is a block diagram that illustrates an example of a multi-function peripheral ("MFP") in a network environment, according to an embodiment of the invention.

The description herein is provided in sections organized as follows:
1.0 Architectural Overview
  1.1 Client
  1.2 Network
  1.3 Device Facility Manager
  1.4 WSD Manager
    1.4.1 General API
    1.4.2 General API Implementation
  1.5 Web Service Application
    1.5.1 Abstract API
    1.5.2 Abstract API Implementation
2.0 Multi-Threaded DFM
3.0 Integrating WS-Discovery functionality within a multi-threaded DFM
4.0 Implementation Mechanisms 1.0 Architectural Overview FIG. 1 is a block diagram that illustrates an example of a device in a network environment according to an embodiment of the invention. In the example shown in FIG. 1, the device is a multi-function peripheral (MFP). An MFP is a device that comprises multiple modules that each perform a different function. Such functions may include, for example, printing, copying, faxing, scanning, archiving, and document-serving. The Ricoh Aficio Color 5560 is an example of an MFP. This MFP can act as a printer, a scanner, and a copying machine, among other uses.

While FIG. 1 depicts the device as being a MFP, in other embodiments of the invention, MFP 102 may correspond to a different device other than a MFP, such as a printer, a copier, a facsimile machine, an image-forming device, a digital camera, and a scanner. Thus, embodiments of the invention may implement a DFM on other devices other than a MFP; however, for ease of explanation, examples discussed herein shall chiefly be discussed in terms of the DFM being implemented on a MFP. As a result, embodiments of the invention are not limited as to what type of device the DFM may be implemented on, e.g., the DFM may be implemented on a vending machine, a kitchen appliance, a personal computer, and an embedded computer.

FIG. 1 shows an MFP 102, a local area network (LAN) 104, a firewall 106, and Internet 108. MFP 102 is coupled communicatively with LAN 104. LAN 104 is coupled communicatively with firewall 106. Firewall 106 is coupled communicatively with Internet 108. Thus, MFP 102 can communicate with other devices via LAN 104, firewall 106, and Internet 108.

MFP 102 comprises multiple different modules, each of which serves a different function. These modules include a central processing unit ("CPU") 110, a network interface (e.g., an Ethernet card) 112, memory (e.g., random access memory ("RAM")) 114, a storage device (e.g., a hard disk drive) 116, a display (e.g., a liquid crystal display) 118, a front panel input device (e.g., a keypad) 120, a fax engine 122, a scan engine 124, and a print engine 126. In various embodiments of the invention, an MFP may comprise more, fewer, or different modules than those illustrated in FIG. 1.

Figure 2:
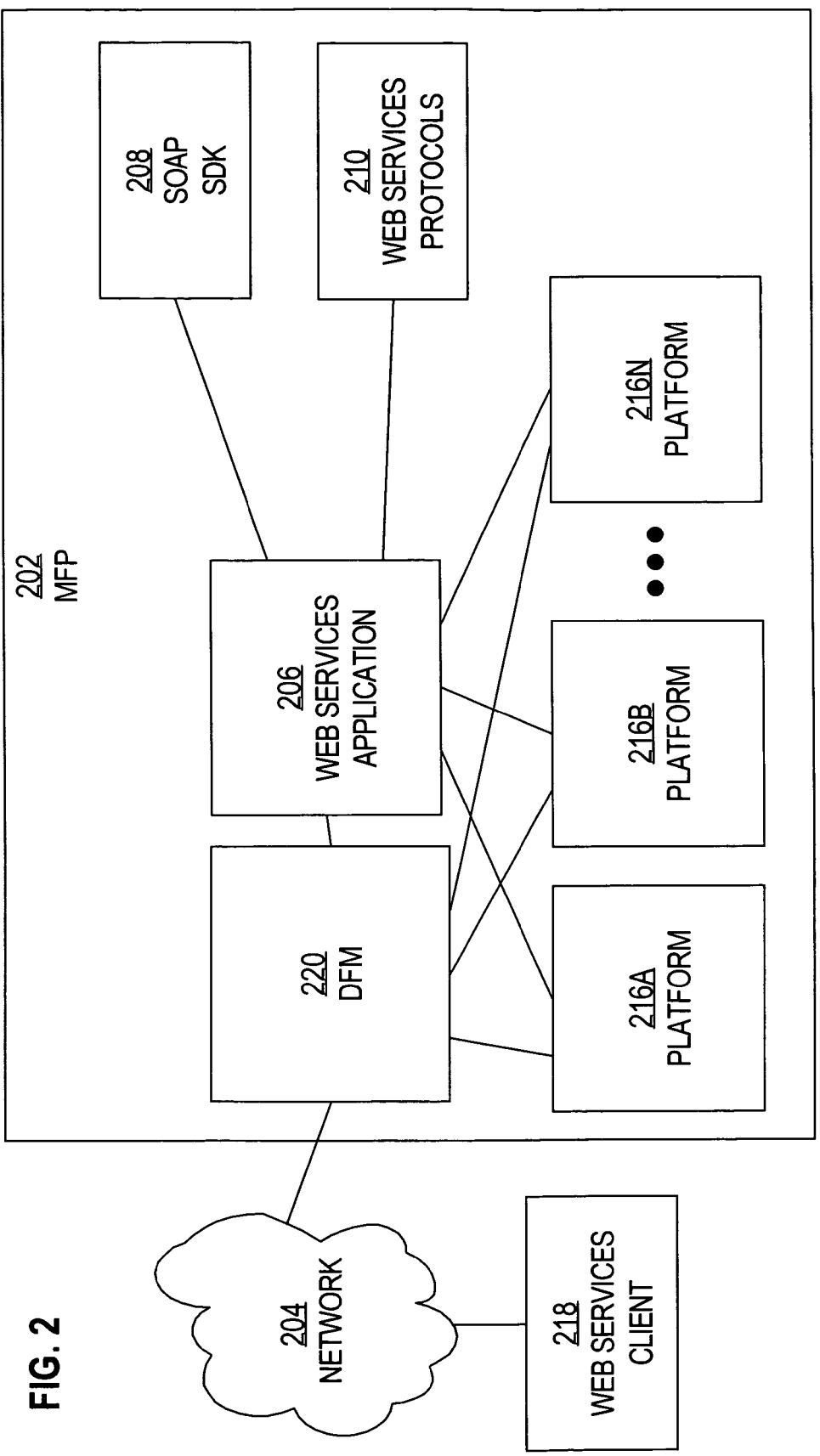
FIG. 2 is a block diagram that illustrates an example of a web services application on an MFP, according to an embodiment of the invention.

FIG. 2 is a block diagram that illustrates a web services application and a DFM on an MFP, according to an embodiment of the invention. FIG. 2 shows an MFP 202 (corresponding to MFP 102 of FIG. 1), a network 204, a web services client 218, and a DFM 220. In one embodiment of the invention, DFM 220 is an implementation of the WS-Device Profile specification. MFP 202 and web services client 218 are communicatively coupled to network 204, and communicate with each other thereby.

MFP 202 comprises a web services application 206, which executes on MFP 202. Web services application 206 communicates with web services client 218 via network 204 and DFM 220. MFP 202 further comprises a SOAP software development kit ("SDK") 208 and web services protocols 210. MFP 202 may comprise any of a number of different platforms 216A-216N. Each such platform may be a different operating system and/or a different set of hardware, for example. Although FIG. 2 shows multiple platforms 216A-216N, in one embodiment of the invention, MFP 202 comprises only one platform, which may be any one of platforms 216A-N.

Figure 3:
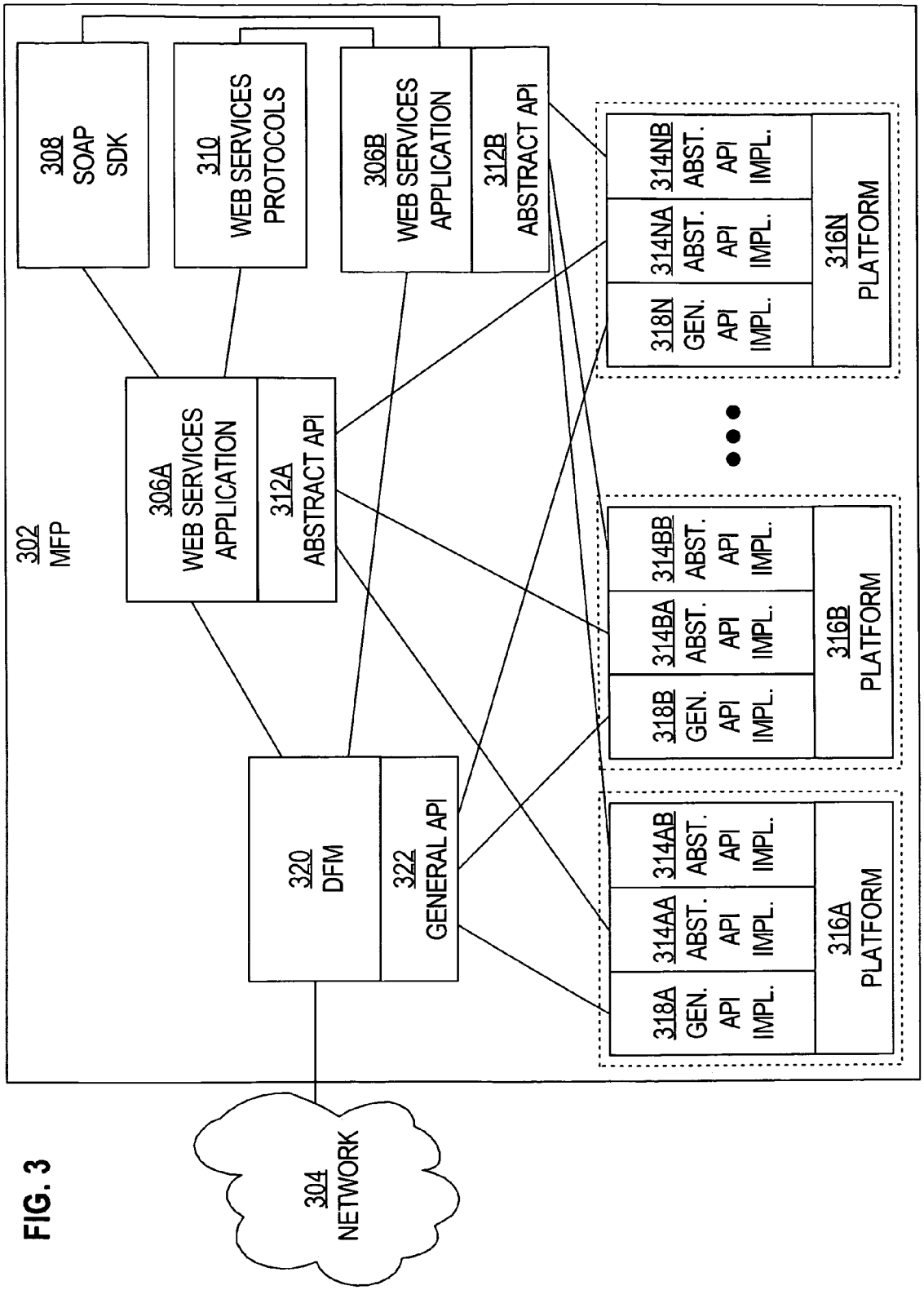
FIG. 3 is a block diagram that illustrates an example of multiple different web services applications and a DFM executing on an MFP, according to an embodiment of the invention.

FIG. 3 is a block diagram that illustrates an example of multiple different web services applications and a DFM executing on an MFP, according to an embodiment of the invention. FIG. 3 shows MFP 302 (corresponding to MFP 202 of FIG. 2) coupled communicatively with network 304. MFP 302 comprises web service application 306A and 306B, each of which may be specialized to handle a specific function of MFP 302. Web service application 306A might be an application that specifically handles printing tasks, while web service application 306B might be an application that specifically handles scanning tasks, for example. Web service applications 306A and 306B are also called "device control protocols" ("DCPs"). MFP 302 also comprises SOAP SDK 308 and web service protocols 310. Web service applications 306A and 308B both use SOAP SDK 308 and web service protocols 310.

MFP 302 may comprise any of a number of different platforms 316A-316N. Each such platform may be a different operating system and/or a different set of hardware, for example. Although FIG. 3 shows multiple platforms 316A-316N, in one embodiment of the invention, MFP 302 comprises only one platform, which may be any one of platforms 316A-N.

For each of platforms 316A-N, there is, for each of web service applications 306A and 306B, a separate API implementation that is specific to that platform and that web service application. Each of abstract API implementations 314AA-NA implements abstract API 312A for a specific platform. Similarly, each of abstract API implementations 314AB-NB implements abstract API 312B for a specific platform. Thus, abstract API implementation 314AA is a platform-specific implementation of abstract API 312A for platform 316A, abstract API implementation 314BA is a platform-specific implementation of abstract API 312A for platform 316B, and so on. Similarly, abstract API implementation 314AB is a platform-specific implementation of abstract API 312B for platform 316A, abstract API implementation 314BB is a platform-specific implementation of abstract API 312B for platform 316B, and so on. Web services application 306A communicates with platforms 316A-N via their corresponding abstract API implementations 314AA-NA, while web services application 306B communicates with platforms 316A-N via their corresponding abstract API implementations 314AB-NB.

MFP 302 also comprises DFM 320, which, in one embodiment of the invention, is an implementation of the WS-DeviceProfile specification. For each of platforms 316A-N, there is a separate general API implementation that is specific to that platform. Each of general API implementations 318A-N implements general API 322 for a specific platform. Thus, general API implementation 318A is a platform-specific implementation of general API 322 for platform 316A, general API implementation 318B is a platform-specific implementation of general API 322 for platform 316B, and so on. DFM 320 communicates with platforms 316A-N via their corresponding general API implementations 318A-N.

Figure 4:
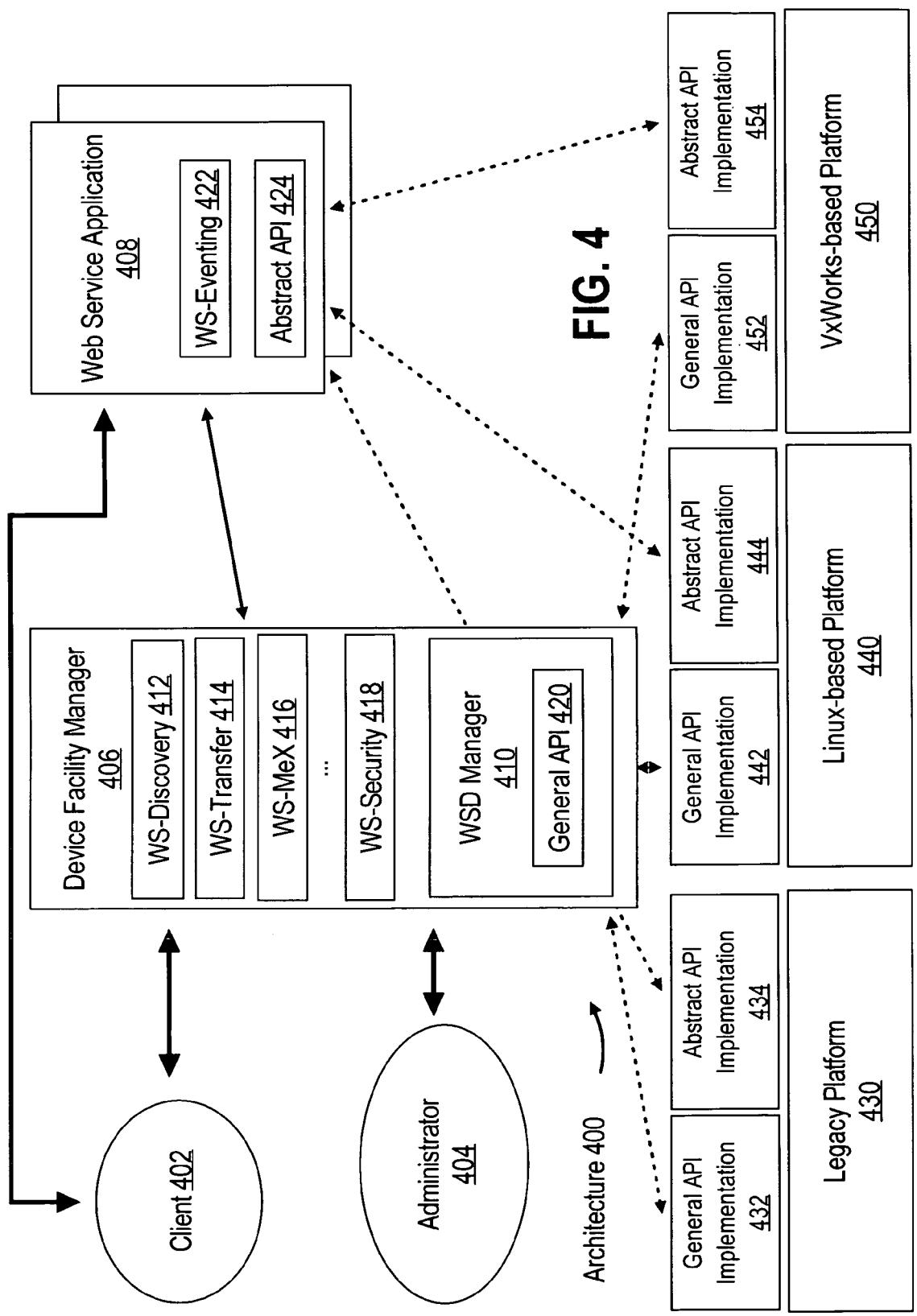
FIG. 4 is a block diagram that illustrates an example architecture of an MFP that comprises a multi-threaded DFM, according to an embodiment of the invention.

FIG. 4 is a block diagram that illustrates an example architecture 400 of an MFP that comprises a multi-threaded DFM, according to an embodiment of the invention. Architecture 400 includes a client 402, an administrator 404, and an MFP that comprises a device facility manager ("DFM") 406 and a plurality of web service applications ("WSAs") 408 executing on the MFP.

The MFP, as indicated by FIG. 4, may comprise any of several platforms (e.g., a legacy platform 430, a Linux-based platform 440, and a VxWorks-based platform 450), upon each of which one or more of the WSAs 408 may execute. The platforms depicted in FIG. 4 are merely provided as examples, as the approach is applicable to any type of platform.

DFM 406 represents the MFP by responding to discovery requests, metadata requests from client 402, and configuration and other MFP administration requests from an administrator 404. DFM 406 may act as a repository of implementations of multiple web service specifications, such as WS-Discovery 412 and WS-MeX (i.e. WS-MetadataExchange) 416.

Client 402 requests services from the MFP. Each WSA 408 executing on the MFP provides a service to client 402 (using the SOAP protocol, for example). Each WSA 408 may employ a service-specific abstract API, such as abstract API 424, independent from the target platform. Each WSA 408 may also employ WS-Eventing 422.

Client 402 discovers that an MFP exists via a discovery request or a discovery HELLO message (i.e., a broadcast or multicast message announcing the MFP to devices on the same network). Once client 402 is aware of the existence of an MFP, client 402 may send a device metadata exchange request (e.g., via WS-MetadataExchange) to discover all the services that the MFP provides. DFM 406, acting for the entire device, receives the request and returns metadata that describes the various services provided by the MFP. Client 402 may request service metadata from a particular web service application executing on the MFP, such as web service application (WSA) 408. WSA 408 may request the service metadata from a web service device (WSD) manager 410, which returns the service metadata to WSA 408. WSA 408 forwards the service metadata to client 402.

Alternatively, the device metadata of the MFP and the service metadata of one or more WSAs may be sent to client 402 in the same response.

Based on the service metadata, client 402 generates and transmits a SOAP request that corresponds to a service provided by WSA 408. WSA 408 receives and processes the SOAP request. Based on a service request, WSA 408 may use an abstract API 424 to make a platform-specific call to an implementation of abstract API 424, such as an abstract API implementation 444. A developer of a web service application (e.g., WSA 408) may focus on the development of the web service itself without having to know the complexities of the underlying platform upon which the web service executes. Therefore, someone with knowledge of the target platform, even other than the web service application developer, may define the implementation of the corresponding abstract API.

1.1 Client

Client 402 is an application that is associated with a process that requests one or more services provided by the MFP. Client 402 is typically an application that is associated with the operating system that supports the initial requesting process. A purpose of client 402 is to convert a platform-specific procedure call from a requesting process into a SOAP request that can be processed by an application that understands SOAP.

For example, the requesting process may be associated with a Microsoft Word application. WSA 408 may provide a print service. Client 402 may be an application that is associated with the operating system that supports the initial requesting process. Client 402 might receive a platform-specific "print data" request that was sent from the requesting process. Client 402 would then encode the print data request into a SOAP message that can be processed by WSA 408.

1.2 Network

SOAP communication between client 402 and the MFP may be made over a network (not shown). The network may be implemented by any medium or mechanism that provides for the exchange of data between various nodes in the network. Examples of such a network include, without limitation, a network such as a Local Area Network (LAN), Wide Area Network (WAN), Ethernet, and/or the Internet, and/or one or more terrestrial, satellite, or wireless links. The network may include a combination of networks such as those described. The network may transmit data according to Transmission Control Protocol (TCP), User Datagram Protocol (UDP), and/or Internet Protocol (IP), for example.

1.3 Device Facility Manager

DFM 406 represents the MFP by accepting discovery requests, requests for logging information, and configuration instructions. According to one embodiment of the invention, DFM 406 also acts as a repository of implementations of multiple web service specifications. Thus, DFM 406 may include a shared library of routines that each implement one or more functions that are defined by one or more web services specifications (e.g., WS-Security and WS-MetadataExchange). In this way, multiple web service specifications may be implemented once and then shared with each of the multiple web service applications (e.g., WSA 408) that execute on the MFP. As a result, developers of web service applications can use and rely on the MFP-implemented web service specification without knowing many details about any of these specifications. Some web service specifications implemented on DFM 406 may include, but are not limited to, WS-Discovery 412, WS-Transfer 414, WS-MeX (i.e. WS-MetadataExchange) 416, and WS-Security 418.

In one embodiment of the invention, DFM 406 includes library routines that correspond to the SOAP protocol. Each SOAP library routine implements one or more functions that are defined by one or more SOAP specifications. The SOAP library routines are used to analyze SOAP requests and package SOAP messages. Multiple versions of the SOAP protocol standard may be supported. Updates to a newer version of a SOAP protocol standard may be performed with little or no modification to WSA 408.

In one embodiment of the invention, DFM 406 sends out broadcast messages to indicate updates to one or more WSAs on the MFP. In one embodiment of the invention, client 402 does not need to subscribe to such an update event. However, in one embodiment of the invention, client 402 registers to receive notifications of updates to one or more WSAs on the MFP. In such an embodiment of the invention, if DFM 406 receives update information that pertains to an update of a particular application, and if client 402 is registered to receive a notification of such an update, then DFM 406 sends, to the client application, a notification of the update.

In one embodiment of the invention, DFM 406 receives update information pertaining to a WSA. For example, WSA 408 may provide a fax service. The MFP might detect that the fax line is disconnected. While the fax service is unavailable, DFM 406 should not respond to future metadata requests with device metadata that indicates that the MFP provides a fax service. Therefore, in response to receiving update information from WSA 408, DFM 406 updates the device and/or service metadata that is associated with WSA 408.

In one embodiment of the invention, DFM 406 receives configuration requests from administrator 404. A configuration request indicates one or more WSAs that are to be configured and/or updated. DFM 406 handles configuration requests and performs, or causes to be performed, the configuration or update instruction on the appropriate WSA. Alternatively, DFM 406 may instruct WSD manager 410 to handle such configuration requests.

In one embodiment of the invention, DFM 406 receives and responds to log requests from administrator 404. DFM 406 retrieves logging information that pertains to one or more WSAs that execute on the MFP. DFM 406 sends the logging information to administrator 404. WSD manager 410 may retrieve and provide the logging information to DFM 406.

1.4 WSD Manager

According to one embodiment of the invention, DFM 406 also comprises WSD manager 410. WSD manager 410 provides a central point for logging information, status inquiries, and external management of the MFP. In one embodiment of the invention, administrator 404 is an application that is configured to retrieve, through WSD manager 410, information that pertains to the MFP. For example, WSD manager 410 may centralize all logging information that comes internally from all WSAs 408 and from the various platforms upon which WSAs 408 are executing. Administrator 404 may also configure, update, or disable a WSA 408 using WSD manager 410.

In one embodiment of the invention, WSD manager 410 maintains overall status information, such as where the MFP is located, which WSAs are installed on the MFP, and whether the WSAs are running properly.

In one embodiment of the invention, WSD manager 410 maintains the metadata for the MFP. In one embodiment of the invention, WSD manager 410 maintains service metadata that pertains to each WSA 408 running on the MFP.

1.4.1 General API

According to one embodiment of the invention, WSD manager 410 retrieves general information that pertains to the MFP, such as the IP address and the model number of the MFP, through general API 420. General API 420 defines an interface by which DFM 406 receives information specific to each platform of the MFP. As a result, a DFM developer is not required to know the details of a specific platform; the DFM developer only needs to know the details of the DFM that the developer is building for an MFP. The dotted lines in FIG. 4 represent API calls from a particular API to the appropriate API implementation.

1.4.2 General API Implementation

If general API 420 has been defined for DFM 406, then a platform-specific implementation of general API 420 is defined. For example, a general API implementation 432 is defined for general API 420 on legacy platform 430. Similarly, a general API implementation 442 is defined for general API 420 on Linux-based platform 440. A general API implementation defines the functions that are specified in a device-specific request and implemented on the MFP. The developer of DFM 406 may define the general API implementation. Alternatively, someone else who has knowledge of the target platform may define the general API implementation.

1.5 Web Service Application

Web services application (WSA) 408 is a module that provides one or more web services and relies on web services protocols and technologies, such as those protocols provided by DFM 406. WSA 408 may also rely on a separate SOAP module (not shown) to analyze SOAP requests if WSA 408 does not include logic for analyzing SOAP requests. As indicated above, the separate SOAP module may be provided by DFM 406 and shared among all WSAs 408.

In one embodiment of the invention, WSA 408 also comprises a WS-Eventing module 422 for responding to event requests from client 402. Client 402 may subscribe to an event that is associated with the service provided by WSA 408. For example, WSA 408 might be a printing application. An event to which client 402 subscribes might be the MFP's completion of a print job. Under such circumstances, upon the event's completion, WSA 408 sends an event message to client 402. The event message indicates that the print job is completed.

1.5.1 Abstract API

WSA 408 may also comprise an abstract API (e.g., abstract API 424) through which device-specific calls may be generated. The abstract API defines an interface by which the associated WSA 408 invokes one or more functions on the MFP. Therefore, the developer of a web service application is not required to know the underlying complexities of the target platform, but only of the new service that the developer aims to provide.

1.5.2 Abstract API Implementation

If an abstract API has been defined by a web service application developer, then an implementation of the abstract API for a specific platform is defined. For example, as shown in FIG. 4, an abstract API implementation 434 is defined for abstract API 424 on legacy platform 430. Similarly, an abstract API implementation 454 is defined for abstract API 424 on VxWorks platform 450. An abstract API implementation defines the functions that are specified in a device-specific request and implemented on the MFP. The developer of the web service application may define the implementation. Alternatively, someone else who has knowledge of the target platform may define the implementation.

2.0 Multi-Threaded DFM

As is discussed above, in one embodiment of the invention, the DFM (e.g., DFM 320) is implemented via multiple concurrently executing threads. In one embodiment of the invention, there are at least four threads, including (1) a WSD manager thread, (2) a WS-Discovery thread, (3) an inside dispatcher thread, and (4) an external request processing thread.

In one embodiment of the invention, when the MFP is powered on, a main thread initializes and starts up multiple components. After the main thread has started up the other threads, the main thread gives control to (or begins acting as) the WSD manager thread. The WSD manager thread monitors the registration and un-registration of web services applications (e.g., web services applications 306A and 306B). The WSD manager thread also monitors any changes that are coming from the MFP via the abstract layer (e.g., general API 322/general API implementation 318A). In response to any such change arising, the WSD manager thread (1) updates a version of device metadata that is stored on the MFP and (2) instructs the WS-Discovery thread to broadcast (e.g., via network 304) the change in the device metadata to other devices that are external to the MFP.

In one embodiment of the invention, the WS-Discovery thread waits for the WSD manager thread's approval to send a "Hello" message. In response to the WS-Discovery thread obtaining such approval from the WSD manager's thread, the WS-Discovery thread broadcasts (e.g., via network 304) a "Hello" message to other devices to indicate the presence of the MFP. After sending such a "Hello" message, the WS-Discovery thread listens for incoming "Probe" and "Resolve" messages. In response to receiving a "Probe" or "Resolve" message, the WS-Discovery thread responds appropriately, as specified by the WS-Discovery specification.

Additionally, in one embodiment of the invention, in response to receiving, from the WSD manager thread, a notification that indicates that the MFP's device metadata has been updated, the WS-Discovery thread broadcasts (e.g., over network 304) the change in the device metadata. For example, the message may indicate to other devices that an additional web service (e.g., printing, scanning, etc.) is now available on the MFP, or that a web service which was previously available on the MFP is now unavailable.

In one embodiment of the invention, the internal dispatcher thread handles message exchanges between DFM 320 and web services applications 306A and 306B, and/or other applications that are executing on the MFP. These messages are composed so that they follow a specified format. The internal dispatcher thread parses received messages. The internal dispatcher thread dispatches these messages to the appropriate component of the DFM. The internal dispatcher thread relays the DFM components' responses to these messages back to the appropriate entities (e.g., web services applications 306A and 306B).

In one embodiment of the invention, the external request processing thread monitors request messages that originate from devices and processes that are external to the MFP. For example, the external request processing thread may monitor messages that web service clients send to the MFP over network 304. Thus, in one embodiment of the invention, the internal dispatcher thread handles only messages that originate within the MFP, while the external request processing thread handles only messages that originate from outside of the MFP. Beneficially, the internal dispatcher and external request processing threads may handle messages concurrently, so that the MFP can react to requests from both within and without in a parallel, rather than a serial, manner. The external message dispatcher thread determines the types of the incoming messages, dispatches the messages to the appropriate DFM components based on the types of those messages, receives responses to the messages from the DFM components to which the messages were dispatched, and sends (e.g. over network 304) the responses to the external entities from which the messages originated.

Beneficially, a multi-threaded DFM allows external requests to be queued and handled on a first-come, first-served basis without impacting the rest of the MFP. Additionally, a multi-threaded DFM allows web services applications to be registered and un-registered with the MFP dynamically, without impacting the other tasks of the DFM. Furthermore, a multi-threaded DFM allows communications with the MFP platform to be handled without putting any restrictions on the work that the DFM is doing. Additionally, a multi-threaded DFM allows one thread to focus on the business logic of the DFM without needing to do anything regarding communications with the MFP platform, the web services applications, or MFP-external entities. From a programmatic point of view, having a multi-threaded DFM makes the DFM more modular, flexible, and robust.

Figure 5:
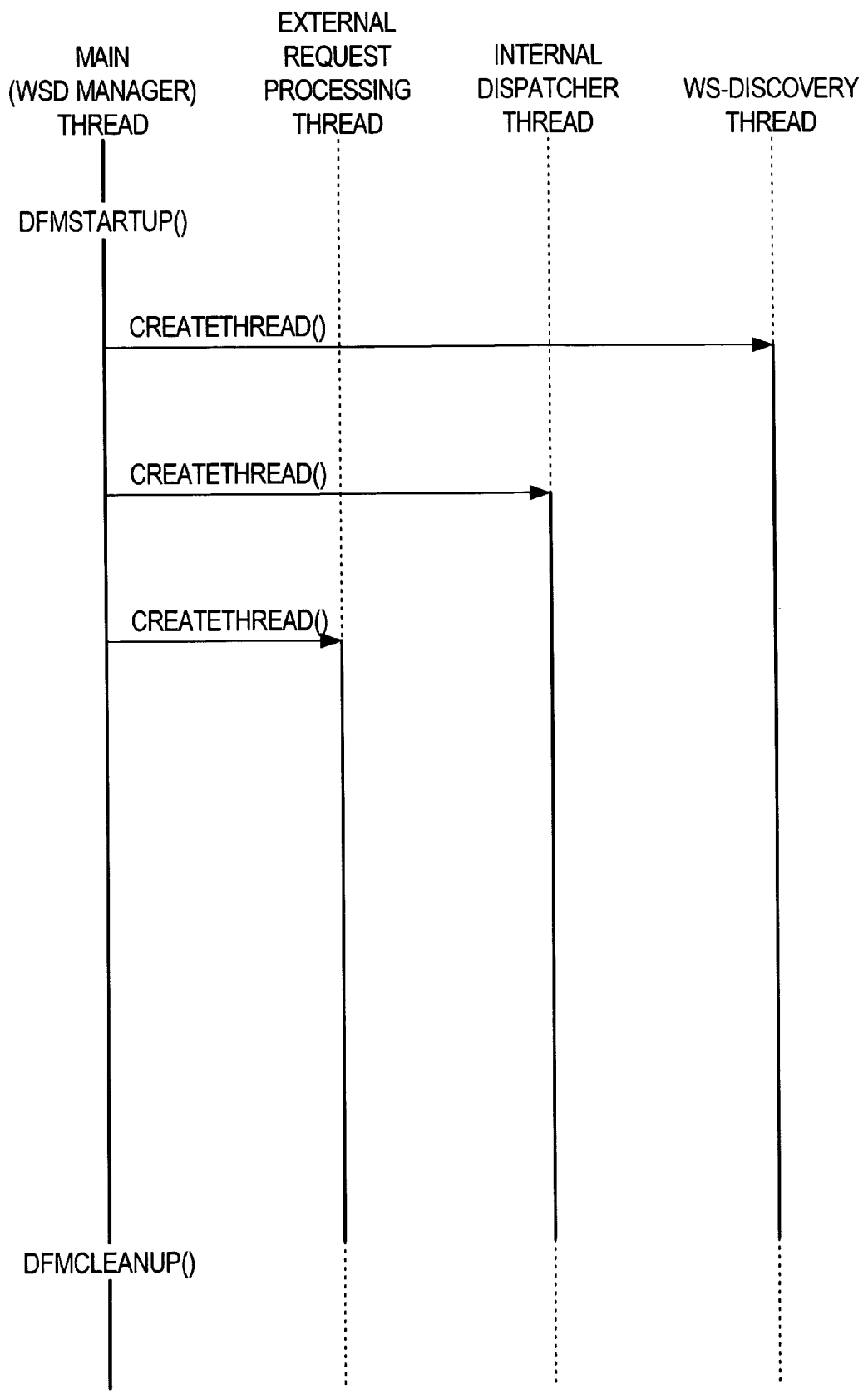
FIG. 5 is a sequence diagram that shows multiple threads of a DFM executing concurrently, according to an embodiment of the invention.

FIG. 5 is a sequence diagram that shows multiple threads of a DFM executing concurrently, according to an embodiment of the invention. A main thread (which may later serve as the WSD manager thread) starts the other threads with invocations of a "CreateThread( )" method, in one embodiment of the invention. The threads created this way include a WS-Discovery thread, an internal dispatcher thread, and an external request processing thread. The WS-Discovery thread implements the WS-Discovery specification and handles discovery requests and responses. The internal dispatcher thread handles communications with entities that are internal to the MFP (e.g., web services applications). The external request processing thread handles (1) the business logic of the DFM and (2) communications with entities that are external to the MFP (e.g., web services clients that access the MFP via a network). In one embodiment of the invention, after creating these other threads, the main thread becomes the WSD manager thread and performs the operations of the WSD manager thread as discussed above (e.g., managing the metadata of the MFP).

Because the external request processing thread is separate from the internal dispatcher thread, the DFM is able to handle communications with MFP-internal and MFP-external entities simultaneously; the DFM does not need to wait for communications with an MFP-internal entity to complete before beginning communications with an MFP-external entity, or vice-versa. Although the embodiment of the invention illustrated includes only four threads, alternative embodiments of the invention may include a greater or lesser number of threads. For example, for each web service application on the MFP, a separate thread could be started to handle communications involving that web service application and no other web service application. However, as the number of threads increases, the overhead required to maintain those threads also increases.

In an alternative embodiment of the invention, there are only two concurrently executing threads: the WS-Discovery thread, which handles all communications specified by the WS-Discovery specification, and another thread which performs operations that are not performed by the WS-Discovery thread.

In one embodiment of the invention, the main thread's invocation of a "DFMCleanUp( )" method causes all of the other threads to shut down in a graceful manner.

Figure 6A:
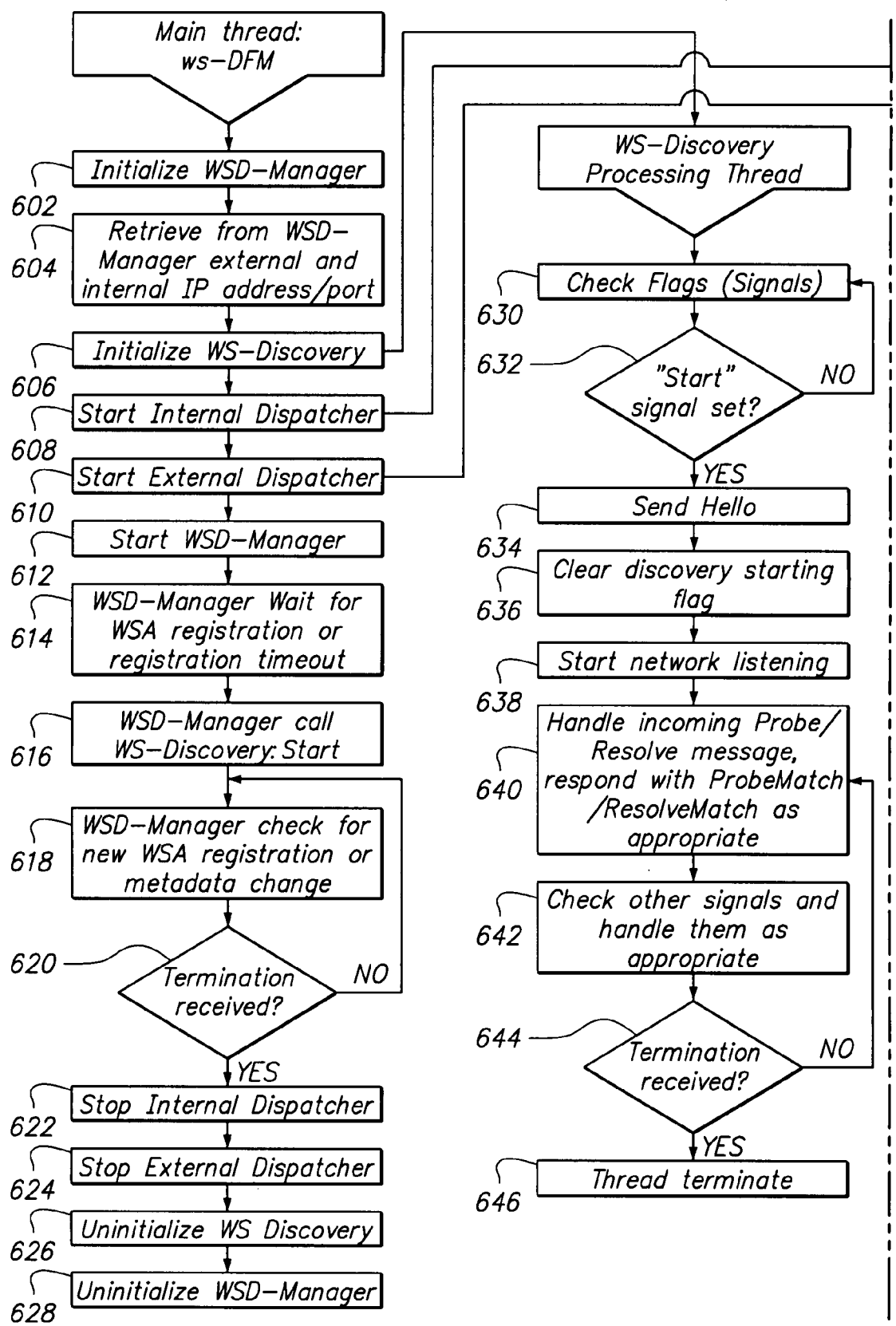
FIG. 6 is a flow diagram that illustrates steps that are performed by several of the concurrently executing threads of a DFM, according to an embodiment of the invention.
Figure 6B:
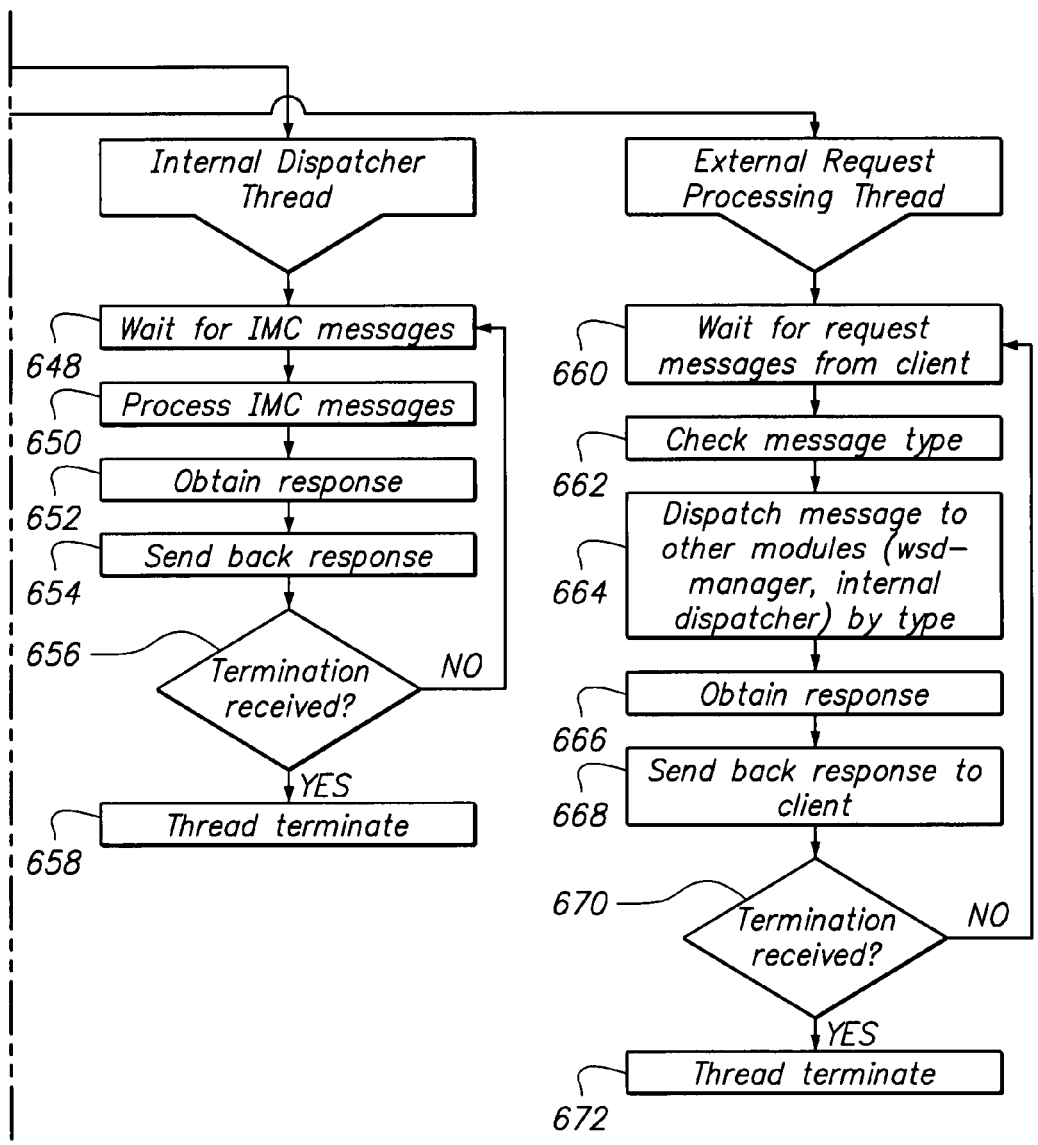
Figure 6:
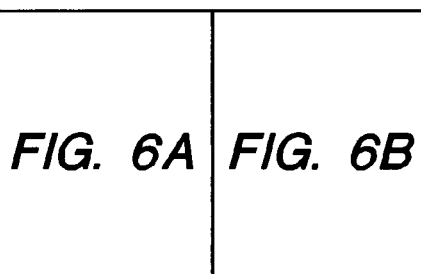

FIG. 6 is a flow diagram that illustrates steps that are performed by several of the concurrently executing threads of a DFM, according to an embodiment of the invention. Some of the steps shown in FIG. 6 may be performed concurrently with others of the steps shown in FIG. 6.

Steps 602-628 are performed by the main thread. In block 602, the WSD manager is initialized. In block 604, the external and internal Internet Protocol (IP) address and port are retrieved from the WSD manager. In block 606, the WS-Discovery thread is initialized. The WS-Discovery thread begins to perform steps 630-646 concurrently with steps 602-628 being performed by the main thread. In block 608, the internal dispatcher thread is initialized. The internal dispatcher thread begins to perform steps 648-658 concurrently with steps 602-628 being performed by the main thread. In block 610, the external request processing thread is initialized. The external request processing thread runs concurrently with the main thread and other threads.

In block 612, the WSD manager is started. In block 614, the WSD manager waits for a web service application registration or a registration timeout. In block 616, the WSD manager instructs WS-Discovery to start. In block 618, the WSD manager checks for a new web service application registration or metadata change. In block 620, a determination is made as to whether a termination signal has been received. If a termination signal has been received, then control passes to block 622. Otherwise, control passes back to block 618.

In block 622, the internal dispatcher thread is stopped. In block 624, the external request processing thread is stopped. In block 626, the WS-Discovery thread is un-initialized. In block 628, the WSD manager is uninitialized.

The WS-Discovery thread runs concurrently with the other threads. In block 630, flags (signals) are checked. In block 632, a determination is made as to whether a "start" signal has been set (e.g., by the WSD manager in block 616). If a "start" signal has been set, then control passes to block 634. Otherwise, control passes back to block 630.

In block 634, a "Hello" message is sent. In block 636, a discovery starting flag is cleared. In block 638, the WS-Discovery thread begins listening on the network. In block 640, incoming (e.g., from the network) "Probe" and "Resolve" messages are handled and "ProbeMatch" and "ResolveMatch" messages are sent (e.g., over the network) in response as appropriate. In block 642, other signals are checked and handled as appropriate. In block 644, a determination is made as to whether a termination signal has been received. If a termination signal has been received, then control passes to block 646. Otherwise, control passes back to block 640.

In block 646, the WS-Discovery thread terminates.

The internal dispatcher thread runs concurrently with the main thread and the other threads. In block 648, the internal dispatcher thread waits for inter-module communication ("IMC") messages. IMC messages are communications within the MFP, between the DFM and the WSAs. IMC messages are processed by the internal dispatcher thread. In block 650, IMC messages are processed. In block 652, the internal dispatcher thread obtains one or more responses to one or more IMC messages. In block 654, the internal dispatcher thread sends the one or more responses back to the entities from which the IMC messages were received. In block 656, a determination is made as to whether a termination signal has been received. If a termination signal has been received, then control passes to block 658. Otherwise, control passes back to block 648.

In block 658, the internal dispatcher thread terminates.

The external request processing thread runs concurrently with the main thread and the other threads. In block 660, the external request processing thread waits for request messages from a client (e.g., web services client 218) that is external to the MFP. In block 662, the message type is checked. In block 664, the message is dispatched to other modules or threads (e.g., the WSD manager and/or the internal dispatcher thread) based on the message's type. In block 666, the external dispatcher thread obtains a response to the message from the module or thread to which the message was dispatched. In block 668, the response is sent back to the client from which the message was received. In block 670, a determination is made as to whether a termination signal has been received. If a termination signal has been received, then control passes to block 672. Otherwise, control passes back to block 660.

In block 672, the external request processing thread terminates.

3.0 Integrating Discovery Functionality within a Multi-Threaded DFM

In an embodiment, a DFM, such as DFM 320, may be implemented via multiple concurrently executing threads. As discussed above, a multi-threaded DFM may include at least four threads, including (1) a WSD manager thread, (2) a discovery thread, (3) an inside dispatcher thread, and (4) an external request processing thread.

In other embodiments of the invention, the multi-threaded DFM may also include a DFM signal handler thread. In an embodiment, the DFM signal handler thread is responsible for informing the other threads of the multi-threaded DFM when a particular signal is detected. Such signals may include a signal associated with a command to power down the device upon which the multi-threaded DFM is implemented and a signal associated with a determination that a lost network connection has been reestablished.

In an embodiment, the discovery thread performs the majority of discovery functionality, such as sending Hello messages and Bye messages, listening for Probe and Resolve messages, and replying to Probe and Resolve messages with ProbeMatch and ResolveMatch messages respectively. While the activities performed by the discovery thread shall chiefly be described herein in the context of performing discovery functionality in accordance with the WS-Discovery protocol, it is contemplated that other embodiments of the invention may employ a discovery thread that performs discovery functionality in accordance with one or more discovery protocols besides the WS-Discovery protocol, e.g., in other embodiments, the discovery thread may perform discovery functionality in accordance with any discovery protocol other than the WS-Discovery protocol.

In an embodiment, threads of the multi-threaded DFM may monitor a set of flags. Upon a thread detecting that a flag has been set, the thread may perform a responsive action. For example, when a particular flag, associated with a change in the capabilities of the device implementing the DFM, is set, the discovery thread sends a new Hello message, that reflects the new capabilities of the device, over the network. In this way, threads of the DFM may communicate with each other by setting and reading flags, thereby minimizing the time in which one thread is waiting upon another. The process of threads of the DFM setting and reading flags shall be discussed in further detail below with reference to FIGS. 8 and 9.

Device metadata is stored at, or accessible to, a MFP. Device metadata may include data that describes information that identifies the MFP, e.g., device metadata may include information about the serial number or model of the MFP. Device metadata may also include information ("capability information") that describes the current capabilities of the MFP, e.g., capability information may include information about the services currently provided by the MFP.

In an embodiment of the invention, in response to the discovery thread receiving a notification that indicates that device metadata for MFP 202 has been changed, the discovery thread broadcasts (e.g., over network 204) a message that indicates the device metadata for MFP 202 has changed. The broadcast message sent by the discovery thread may contain, in whole or in part, device discovery data.

In an embodiment, device discovery data may include information about the device type and scope of the MFP. In addition, device discovery data may include address information that describes how entities should communicate with the MFP, e.g., the address information may identify an IP address of the MFP. Additionally, the device discovery data may identify a metadata version associated with the device metadata of the MFP. For example, the metadata version may be incremented each time the device metadata changes. If a recipient of the device discovery data has a lower metadata version than the metadata version identified by device discovery data, the recipient of the device discovery data may be informed that the device metadata has changed, and may take an appropriate action. In an embodiment, the broadcast message sent by the discovery thread may identify the metadata version without including other types of device discovery data. This manner of informing an entity that the device metadata of a MFP has changed is merely illustrative, as other approaches may be used.

In an embodiment, the operation of the multi-threaded DFM is more efficient by integrating the performance of discovery functionality within the DFM. The discovery thread interacts with the WSD-Manager thread. The WSD-Manager thread provides the discovery thread with device discovery data and notification of changes in the device metadata. In this way, the discovery thread may be notified when a change in MFP 202 occurs and may obtain device discovery data reflecting the new capabilities of MFP 202. The communication between the WSD-Manager thread and the discovery thread ensures that the information passed to the discovery thread is current and up to date.

In an embodiment, the WSD-Manager thread also controls when the execution of the discovery thread starts and stops. This control of the WSD-Manager thread over the discovery thread may be implemented using a flag, thereby yielding an efficient communication between the two threads and allowing the WSD-Manager thread to quickly return from API calls made to set the flag to communicate with the discovery thread.

In an embodiment, the discovery thread may also interact with the DFM signal handler thread. Such interaction may be accomplished by the DFM signal handler thread setting an appropriate flag that the discovery thread monitors. Once the discovery thread detects that a flag has been set, the discovery thread may make an appropriate action, such as sending a WS-Discovery Hello Message or terminating the discovery thread.

In an embodiment, the discovery thread may be implemented using a static class with no instance member data or member functions. Such an approach is advantageous, as the complexities of managing pointers to instantiated objects may be avoided.

Figure 8:
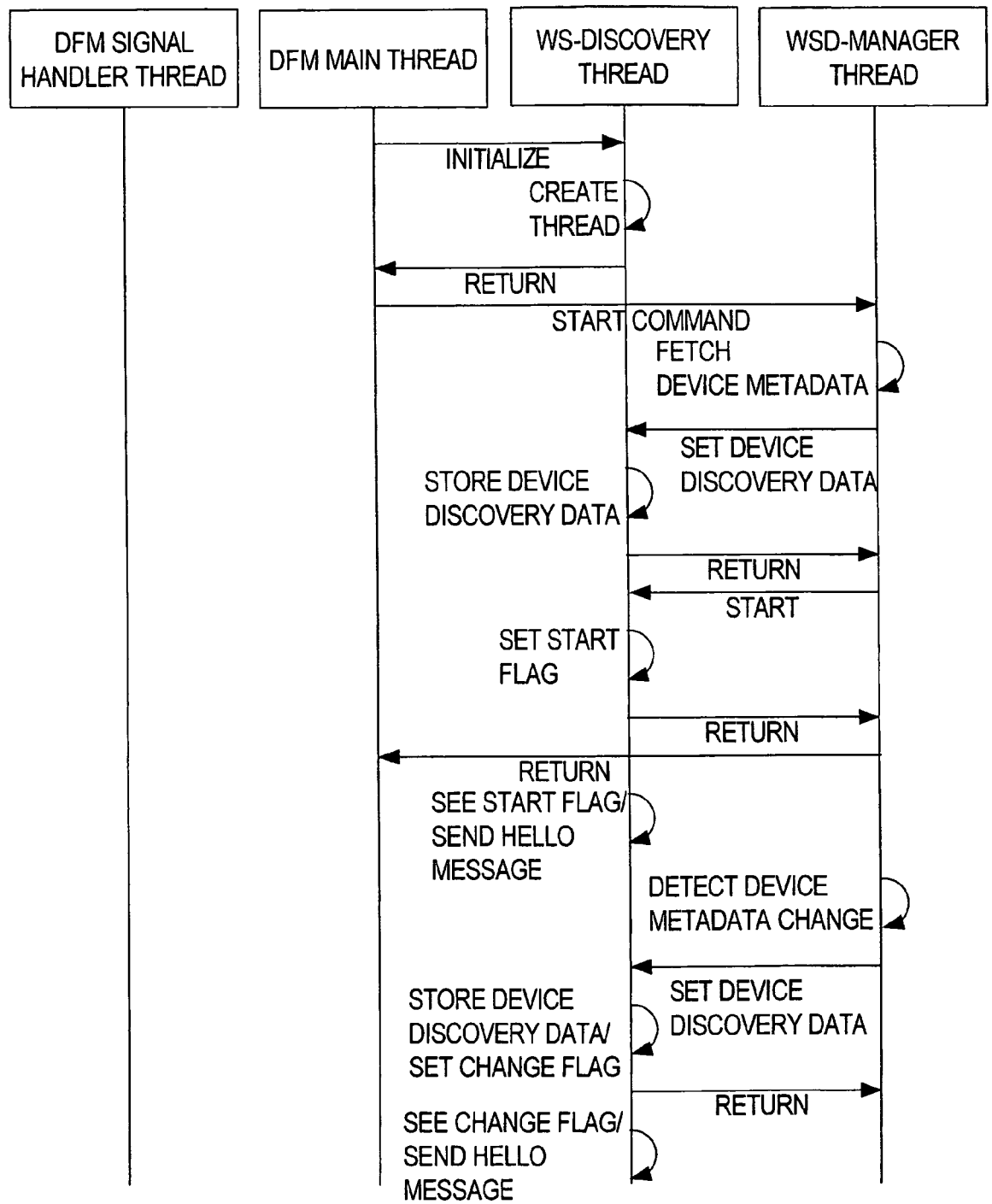
FIG. 8 is a first sequence diagram illustrating communication between multiple threads of a DFM according to an embodiment of the invention.

To further illustrate the interaction between threads of the multi-threaded DFM, consider FIGS. 8 and 9. FIG. 8 is a first sequence diagram illustrating communication between modules of a DFM according to an embodiment of the invention. For ease of explanation, the illustrative threads of an exemplary multi-threaded DFM shall be explained with reference to their implementation on MFP 102 of FIG. 1 (reference will also be made to FIG. 2, which illustrates MFP 202, which is a more detailed illustration of MFP 102).

As shown in FIG. 8, the DFM main thread initializes the discovery thread. In an embodiment, the DFM main thread uses a static class to initialize the discovery thread. The DFM main thread may provide certain information, such as a network address of the device in which the DFM is implemented, to the static class when initializing the discovery thread.

After the discovery thread is created, the DFM Main thread may instruct the WSD-Manager thread to start. In response, the WSD-Manager thread may fetch device metadata for DFM 202. After retrieving the device metadata, the WSD-Manager thread provides the discovery thread with device discovery data. The discovery thread, in turn, stores the device discovery data. Prior to storing the device discovery data, the discovery thread may parse, validate, and/or perform additional processing on the device discovery data to ensure its accuracy.

After the discovery thread has stored device discovery data, the WSD-Manager thread may make an API call to set a flag (the "start flag") associated with instructing the discovery thread to start the performance of its duties. In an embodiment, the discovery thread, once created, would monitor this flag. As a result, once the start flag is set, the discovery thread detects that the start flag is set, clears the start flag, and commences the performance of its duties. For example, the discovery thread duties may include listening for Probe and Resolve messages, continuing to monitor flags used in communicating with other threads, sending Hello messages, and sending ProbeMatch and ResolveMatch messages as appropriate. Messages (such as hello messages, ProbeMatch messages, and ResolveMatch messages) sent by the discovery thread may contain information about what services are supported by the device implementing the DFM, e.g., the Hello message may indicate which DCPs are active at DFM 202.

In an embodiment, at some later point in time, the WSD-Manager thread may detect a change in the device metadata and/or the device discovery data. For example, the WSD-Manager thread may detect that a particular DCP is no longer available or that the IP address of the MFP has changed. In response to the WSD-Manager thread detecting a change in the device metadata and/or device discovery data, the WSD-Manager thread notifies the discovery thread of the change and provides the discovery thread with an updated set of device discovery data that reflects the change. The discovery thread, in turn, stores the device discovery data. As before, prior to storing the device discovery data, the discovery thread may parse, validate, and/or perform additional processing on the device discovery data to ensure its accuracy.

In an embodiment, the WSD-Manager thread may set a flag (the "change flag") associated with notifying the discovery thread to that metadata has been updated. The discovery thread may monitor this flag. As a result, once the change flag is set, the discovery thread clears the change flag, and sends new Hello messages, over network 204, to inform listening entities that device metadata for the MFP has changed and to inform listening entities of any updated device discovery data. In this way, the change in the MFP may be publicized in an efficient and timely manner so that interested parties may be quickly notified of the change in the device metadata of the MFP.

FIG. 9 is a second sequence diagram illustrating communication between threads of a multi-threaded DFM according to an embodiment of the invention. As shown in the embodiment of FIG. 9, the DFM signal handler thread may, at some point in time, detect that a "network reset" has occurred. A network reset may occur when a device's connection to a network is lost and then regained. For example, MFP 102 may experience a network reset when a router in local area network 104 is rebooted or MFP 102 regains a lost network connection.

After the DFM signal handler thread detects that a "network reset" has occurred, the DFM signal handler thread may instruct the discovery thread to handle the reconnection. In an embodiment, the DFM signal handler thread may instruct the discovery thread to handle the reconnection by setting a flag (the "network reset flag") that is accessible to the discovery thread. Once the discovery thread detects that the network reset flag has been set, the discovery thread clears the network reset flag and sends out a new Hello message over network 204. In this way, other devices on the network (such as web services client 218 of FIG. 2) may be notified that MFP 202 is online and available. After the discovery thread sends the new Hello message, the discovery thread will continue to listen for Probe and Resolve messages as well as monitor flags used in communicating with other threads.

Also illustrated in the embodiment of FIG. 9, the DFM signal handler thread may, at some point in time, detect that a "device shutdown signal" has been received. A device shutdown signal corresponds to a command, received at MFP, that instructs the MFP to shut down. For example, an administrator may send a device shutdown signal to MFP 202 of FIG. 2 to cause MFP 202 to power down.

Once DFM signal handler thread receives the device shutdown signal, the DFM signal handler instructs the WSD-Manager thread to stop. The WSD-Manager thread, in turn, instructs the discovery thread to stop. In the embodiment depicted in FIG. 8, the WSD-Manager thread instructs the discovery thread to start processing by setting a start flag. Similarly, in the embodiment depicted in FIG. 9, the WSD-Manager thread instructs the discovery thread to stop processing by setting a stop flag. In this way, the WSD-Manager thread may control when the discovery thread begins and ends processing.

After the discovery thread detects that the stop flag has been set, the discovery thread clears the stop flag and stops processing. For example, the discovery thread may stop processing by sending a Bye message over network 204 to inform all web services clients that MFP 202 is no longer available, and may subsequently stop listening for messages.

At some point in time after the DFM signal handler thread has sent a stop command to the WSD-Manager thread, the DFM signal handler thread may send a stop command to the DFM main thread. Upon the DFM main thread receiving the stop command from the DFM signal handler thread, the DFM main thread sends an unitialize command to the discovery thread. In an embodiment, the unitialize command may be sent by the DFM main thread by setting a clean up flag that is accessible to the discovery thread.

In an embodiment, when the discovery thread detects that the clean up flag has been set, the discovery thread clears the clean up flag and performs clean up functionality. The clean up functionality performed by the discovery thread may include cleaning up or deallocating any data structures associated with the discovery thread.

In an embodiment, when a MFP detects that a change to a web service provided the MFP has occurred, the MFP send a new hello message over the network. However, if the change is temporary, e.g., a scanner service is being taken down temporarily, the MFP may determine that a new hello message need not be sent over the network. In such an embodiment, upon the MFP determining that a change to a service is not temporary, the discovery thread may cause a hello message (such as a WS-Discovery Hello message) to be sent over network 204, and upon the MFP determining that a change to a service is temporary, discovery thread may determine a hello message should not be sent over network 204.

4.0 Implementation Mechanisms

Figure 7:
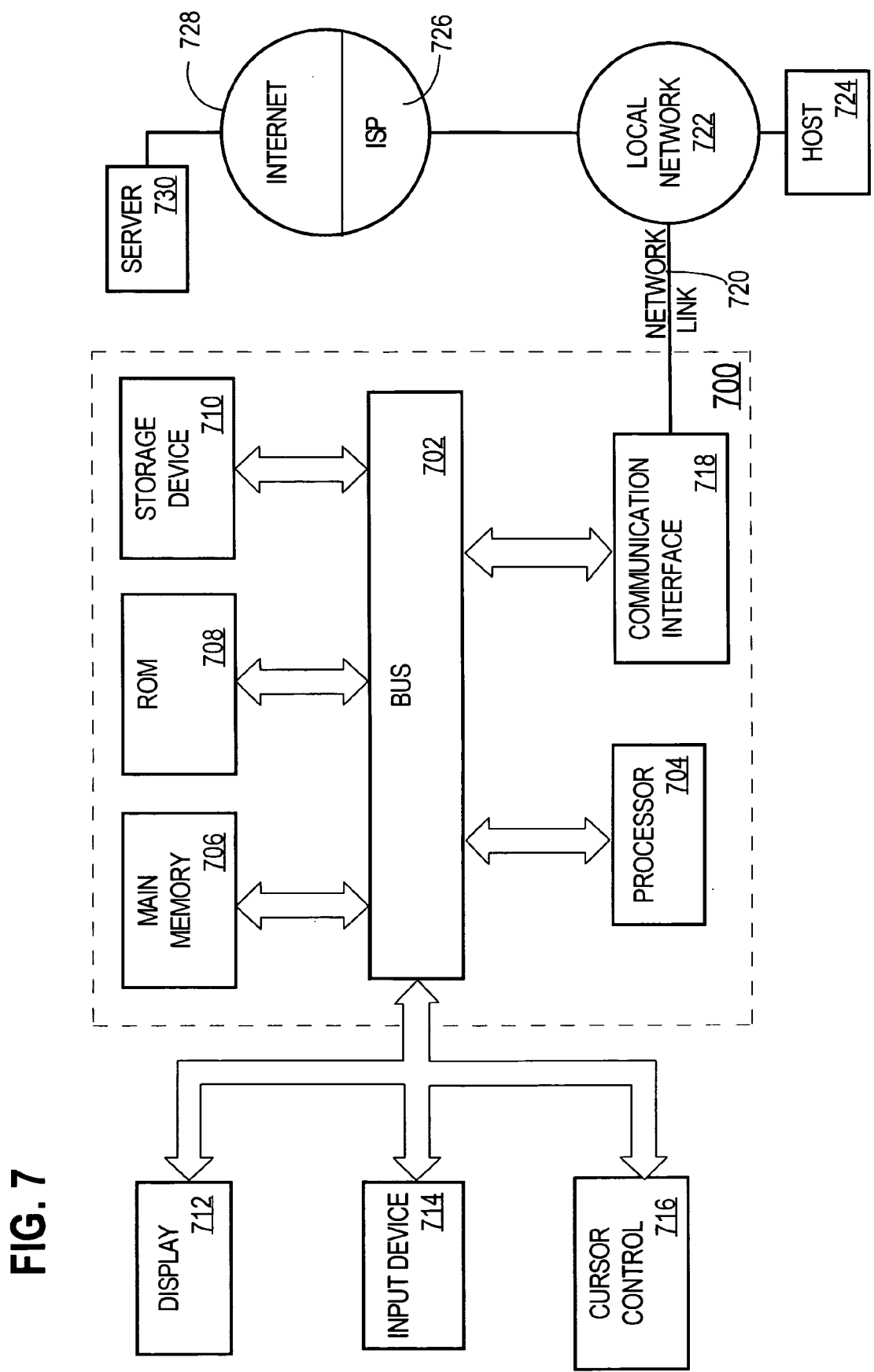
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for advertising a device over a network, comprising:

executing, on the device, a device facility manager comprising a plurality of concurrently executing threads, each of which executes separately from one or more applications that each provides a service to one or more other devices;

wherein a device manager thread, of the plurality of concurrently executing threads, detects one or more changes to the device via an application programming interface (API) through which the device manager thread receives information that is specific to a platform of the device, wherein a web services discovery thread, of the plurality of concurrently executing threads, performs, on behalf of the one or more applications, a set of one or more functions specified by a web services discovery specification;

in response to the device manager thread detecting, via the API, a change to a capability of a first service of one or more services hosted on the device, the device manager thread, on the device:

updating metadata of the device to cause the metadata to reflect the change to the capability of the first service, and communicating with the web services discovery thread to indicate that metadata has changed;

the web services discovery thread, on the device, causing, on behalf of the first service, a message to be sent over the network in response to the communication from the device manager thread, wherein the message indicates that the metadata has changed, wherein the device is one of: a multi-function peripheral, a printer, a copier, a facsimile machine, and a scanner.

2. The method of claim 1, wherein said web services discovery thread is implemented using a static class.

3. The method of claim 1, wherein said device manager thread communicates with said web services discovery thread by setting a flag accessible to said web services discovery thread.

4. The method of claim 3, wherein the web services discovery thread causing the message to be sent over the network is performed upon the web services discovery thread detecting that the flag has been set.

5. The method of claim 1, further comprising:

a first thread of the plurality of concurrently executing threads communicating a first message to a second thread of the plurality of concurrently executing threads using a flag, wherein said first message indicates one of: said second thread should start listening on said network, said second thread should stop listening on said network, said second thread should terminate, said second thread should cause a second message to be sent over said network to inform recipients of said second message that device metadata for said device has changed, and said second thread should cause a second message to be sent over said network to inform recipients of said second message that a service provided by said device is available.

6. One or more non-transitory machine-readable storage media storing instructions for advertising a device over a network, wherein execution of the instructions by one or more processors causes:

executing, on the device, a facility manager comprising a plurality of concurrently executing threads, each of which executes separately from one or more applications that each provides a service to one or more other devices;

wherein a device manager thread, of the plurality of concurrently executing threads, detects one or more changes to the device via an application programming interface (API) through which the device manager thread receives information that is specific to a platform of the device, wherein a web services discovery thread, of the plurality of concurrently executing threads, performs, on behalf of the one or more applications, a set of one or more functions specified by a web services discovery specification;

in response to the device manager thread detecting, via the API, a change to a capability of a first service of one or more services hosted on the device, the device manager thread, on the device:

updating metadata of the device to cause the metadata to reflect the change to the capability of the first service, and communicating with the web services discovery thread to indicate that metadata has changed;

the web services discovery thread, on the device, causing, on behalf of the first service, a message to be sent over the network in response to the communication from the device manager thread, wherein the message indicates that the metadata has changed, wherein the device is one of: a multi-function peripheral, a printer, a copier, a facsimile machine, and a scanner.

7. The one or more volatile or non-volatile machine-readable media of claim 6, wherein said web services discovery thread is implemented using a static class.

8. The one or more volatile or non-volatile machine-readable media of claim 6, wherein said device manager thread communicates with said web services discovery thread by setting a flag accessible to said web services discovery thread.

9. The one or more volatile or non-volatile machine-readable media of claim 8, wherein the web services discovery thread causing the message to be sent over the network is performed upon the web services discovery thread detecting that a flag has been set.

10. The one or more volatile or non-volatile machine-readable media of claim 6, wherein execution of the instructions by the one or more processors further causes:

a first thread of the plurality of concurrently executing threads communicating a first message to a second thread of the plurality of concurrently executing threads using a flag, wherein said first message indicates one of: said second thread should start listening on said network, said second thread should stop listening on said network, said second thread should terminate, said second thread should cause a second message to be sent over said network to inform recipients of said second message that device metadata for said device has changed, and said second thread should cause a second message to be sent over said network to inform recipients of said second message that a service provided by said device is available.

11. An apparatus for advertising a device over a network, comprising:

one or more hardware processors; and a computer-readable medium storing instructions, which when executed by said one or more hardware processors, causes:

executing, on the device, a management device facility manager comprising a plurality of concurrently executing threads, each of which executes separately from one or more applications that each provides a service to one or more other devices;

wherein a device manager thread, of the plurality of concurrently executing threads, detects one or more changes to the device via an application programming interface (API) through which the device manager thread receives information that is specific to a platform of the device, wherein a web services discovery thread, of the plurality of concurrently executing threads, performs, on behalf of the one or more applications, a set of one or more functions specified by a web services discovery specification;

in response to the device manager thread detecting, via the API, a change to a capability of a first service of one or more services hosted on the device, the device manager thread, on the device:

updating metadata of the device to cause the metadata to reflect the change to the capability of the first service, and communicating with the web services discovery thread to indicate that metadata has changed;

the web services discovery thread, on the device, causing, on behalf of the first service, a message to be sent over the network in response to the communication from the device manager thread, wherein the message indicates that the metadata has changed, wherein the device is one of: a multi-function peripheral, a printer, a copier, a facsimile machine, and a scanner.

12. The apparatus of claim 11, wherein said web services discovery thread is implemented using a static class.

13. The apparatus of claim 11, wherein said device manager thread communicates with said web services discovery thread by setting a flag accessible to said web services discovery thread.

14. The apparatus of claim 13, wherein the web services discovery thread causing the message to be sent over the network is performed upon the web services discovery thread detecting that a flag has been set.

15. The apparatus of claim 11, wherein execution of the instructions by the one or more processors further causes:

a first thread of the plurality of concurrently executing threads communicating a first message to a second thread of the plurality of concurrently executing threads using a flag, wherein said first message indicates one of: said second thread should start listening on said network, said second thread should stop listening on said network, said second thread should terminate, said second thread should cause a second message to be sent over said network to inform recipients of said second message that device metadata for said device has changed, and said second thread should cause a second message to be sent over said network to inform recipients of said second message that a service provided by said device is available.

16. The method of claim 1, wherein:
the one or more services are a plurality of services that include the first service and a second service that is different than the first service; and
the method further comprising:
in response to the device manager thread detecting a change to a capability of the second service that is hosted on the device, the device manager thread, on the device:
updating the metadata of the device to cause the metadata to reflect the change to the capability of the second service, and
communicating with the web services discovery thread to indicate that metadata has changed;
the web services discovery thread, on the device, causing, on behalf of the second service, a second message to be sent over the network in response to the communication from the device manager thread, wherein the second message indicates that the metadata has changed.

17. The one or more volatile or non-volatile media of claim 6, wherein:
the one or more services are a plurality of services that include the first service and a second service that is different than the first service; and
wherein execution of the instructions by the one or more processors further causes:
in response to the device manager thread detecting a change to a capability of the second service that is hosted on the device, the device manager thread, on the device:
updating the metadata of the device to cause the metadata to reflect the change to the capability of the second service, and
communicating with the web services discovery thread to indicate that metadata has changed;
the web services discovery thread, on the device, causing, on behalf of the second service a second message to be sent over the network in response to the communication from the device manager thread, wherein the second message indicates that the metadata has changed.

18. The apparatus of claim 11, wherein:
the one or more services are a plurality of services that include the first service and a second service that is different than the first service; and
wherein execution of the instructions by the one or more processors further causes:
in response to the device manager thread detecting a change to a capability of the second service that is hosted on the device, the device manager thread, on the device:
updating the metadata of the device to cause the metadata to reflect the change to the capability of the second service, and
communicating with the web services discovery thread to indicate that metadata has changed;
the web services discovery thread, on the device, causing, on behalf of the second service a second message to be sent over the network in response to the communication from the device manager thread, wherein the second message indicates that the metadata has changed.

* * * * *